United States Patent [19]
Yoshisato

[11] 3,983,491
[45] Sept. 28, 1976

[54] TELEVISION CHANNEL INDICATOR

[75] Inventor: Akiyuki Yoshisato, Soma, Japan

[73] Assignee: Alps Electric Co., Ltd., Tokyo, Japan

[22] Filed: Feb. 25, 1975

[21] Appl. No.: 553,071

[30] Foreign Application Priority Data
　　Mar. 1, 1974　Japan.................................. 49-24583

[52] U.S. Cl.............................. 325/455; 324/79 D
[51] Int. Cl.².......................................... G01R 23/14
[58] Field of Search ........ 325/455; 324/78 D, 79 D; 331/64; 178/DIG. 15

[56] References Cited
UNITED STATES PATENTS

| | | | |
|---|---|---|---|
| 3,244,983 | 4/1966 | Ertman | 325/455 |
| 3,509,484 | 4/1970 | Basse | 324/78 D |
| 3,681,707 | 8/1972 | Bean | 324/79 D |
| 3,753,119 | 8/1973 | Close | 325/455 |

*Primary Examiner*—Benedict V. Safourek
*Attorney, Agent, or Firm*—Eliot S. Gerber

[57] ABSTRACT

The video local oscillator signal is mixed with a signal from a fixed frequency oscillator to produce a difference frequency signal, which is frequency divided and gated to a counter during a predetermined time period in such a manner that the final count of the counter contains the channel number, which is digitally displayed.

5 Claims, 4 Drawing Figures

TELEVISION CHANNEL INDICATOR

The present invention relates to a channel indicator especially suitable for a varactor tuned television receiver.

The introducion of electronic or varactor tuning for television receivers has made possible many new forms or tuners, such as push button and remote control models. A major problem with such tuners is that, especially in the UHF band, it is difficult to provide a channel indicator which gives an accurate channel indication. In a UHF varactor tuner, a potentiometer is commonly used to vary the tuning voltage to the varactor unit, and channel indication may be made by means of a scale disposed around the potentiometer shaft and a pointer attached to the shaft. However, it is almost impossible to avoid an error of 3 to 5 channels when selecting a channel higher than channel 50 using such a simple channel indicator, even if careful calibration is made to avoid resistance curve errors in manufacturing the poteniometer and indicator.

Another channel indication method is to connect a meter to the slider of the potentiometer to indicate the tuning voltage using a meter scale calibrated in channel numbers. This method is also inaccurate due to tracking errors in the tuner and calibration errors in the meter.

A prior art channel indicator disclosed in U.S. Pat. No. 3,835,424 to Marik is based on the above described method of indicating the channel number by sensing the tuning voltage. In the disclosure, the D-C tuning voltage is applied to a non-linear shaping network and D-C controlled oscillator which produces a signal whose frequency is a predetermined function of the tuning voltage and is calibrated to the varactor unit of the tuner. The output of the oscillator is gated to a counter during a predetermined period of time so that the final count of the counter is the channel number, which is displayed by Numatron tubes. In addition to the tuner tracking errors described above, this channel indicator is disadvantageous in that the non-linear network and oscillator are difficult to construct in a satisfactorily accurate manner and therefore expensive.

It is therefore an important object of the present invention to provide a channel indicator for a varactor tuned television set which provides an accurate channel indication and overcomes the disadvantages of prior art channel indicators.

It is another object of the present invention to provide a channel indicator which operates by sensing the local oscillator frequency of the television receiver.

It is another object of the present invention to provide a channel indicator which produces a correct channel indication even if the local oscillator frequency is not absolutely accurate.

It is another object of the present invention to provide channel indicator which gives a digital readout and is economical to manufacture on a mass production basis.

The above and other objects, features and advantages of the present invention will become clear from the following detailed description taken with the accompanying drawings, in which.

The present invention is most suitable for a television receiver of the varactor tuning type, although it may be applied to any television, radio or other electromagnetic wave receiver of the hetrodyne type having a local oscillator and in which channel numbers are assigned to the various frequencies which the receiver is arranged to receive.

According to the FCC frequency allocations currently adopted in the United States, a total of 12 VHF television channels and 70 UHF television channels are provided with each channel having a frequency bandwidth of 6MHz. The frequency range of the television channels is divided into four subranges as follows:

| channels | 2–4 | 54–72 | MHz |
| channels | 5–6 | 76–88 | MHz |
| channels | 7–13 | 174–216 | MHz |
| channels | 14–83 | 470–890 | MHz |

Figure 1:
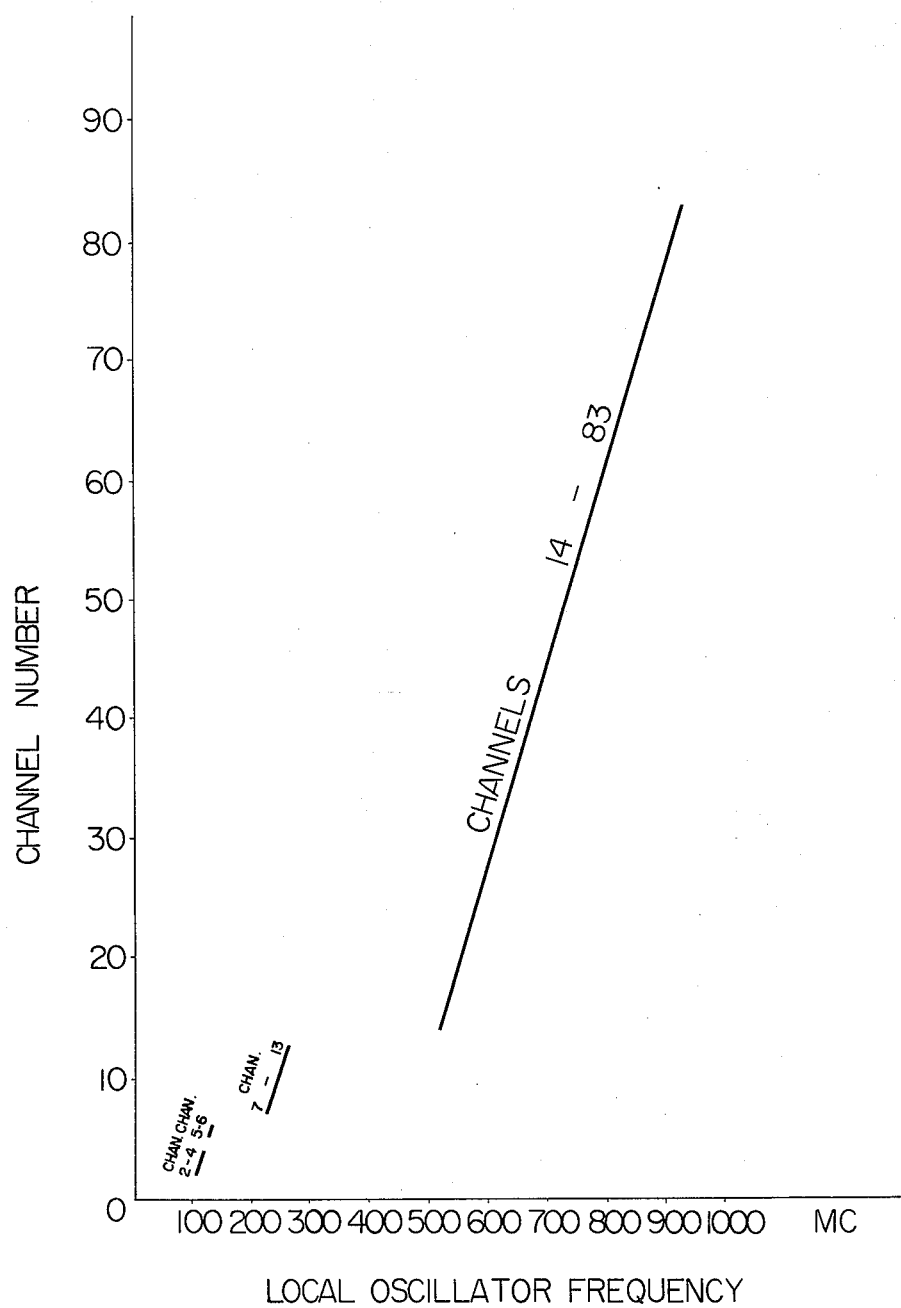
FIG. 1 is a graph illustrating the principles of the present invention.

The picture intermediate frequency (IF) is 45.75MHz. The frequencies between the subranges are used for government services and the like. The picture carrier frequency is 1.25MHz above the lowest frequency of the bandwidth for each channel, and the video local oscillator frequency is equal to the picture carrier frequency plus the IF frequency. As illustrated in FIG. 1, within each subrange, the channel numbers are proportional to the local oscillator frequencies for each channel as expressed by the following equations channels 2–4
$$\text{channel number} = \frac{\text{local oscillator frequency} - 89\text{MHz}}{6 \times 10^6} \quad (1)$$

channels 5–6
$$\text{channel number} = \frac{\text{local oscillator frequency} - 93\text{MHz}}{6 \times 10^6} \quad (2)$$

channels 7–13
$$\text{channel number} = \frac{\text{local oscillator frequency} - 179\text{MHz}}{6 \times 10^6} \quad (3)$$

channels 14–83
$$\text{channel number} = \frac{\text{local oscillator frequency} - 433\text{MHz}}{6 \times 10^6} \quad (4)$$

It will be noted that the slope of all of the lines in FIG. 1 determined by the above equations is the same, and has the value $1/(6 \times 10^6)$ corresponding to the 6MHz channel bandwidth. All of the equations (1) to (4) are in the form $$N = F - B/A \quad (5)$$

where $N$ is the channel number, $F$ is the local oscillator frequency, $A$ is the channel bandwidth (constant) and $B$ is also a constant.

Figure 2:
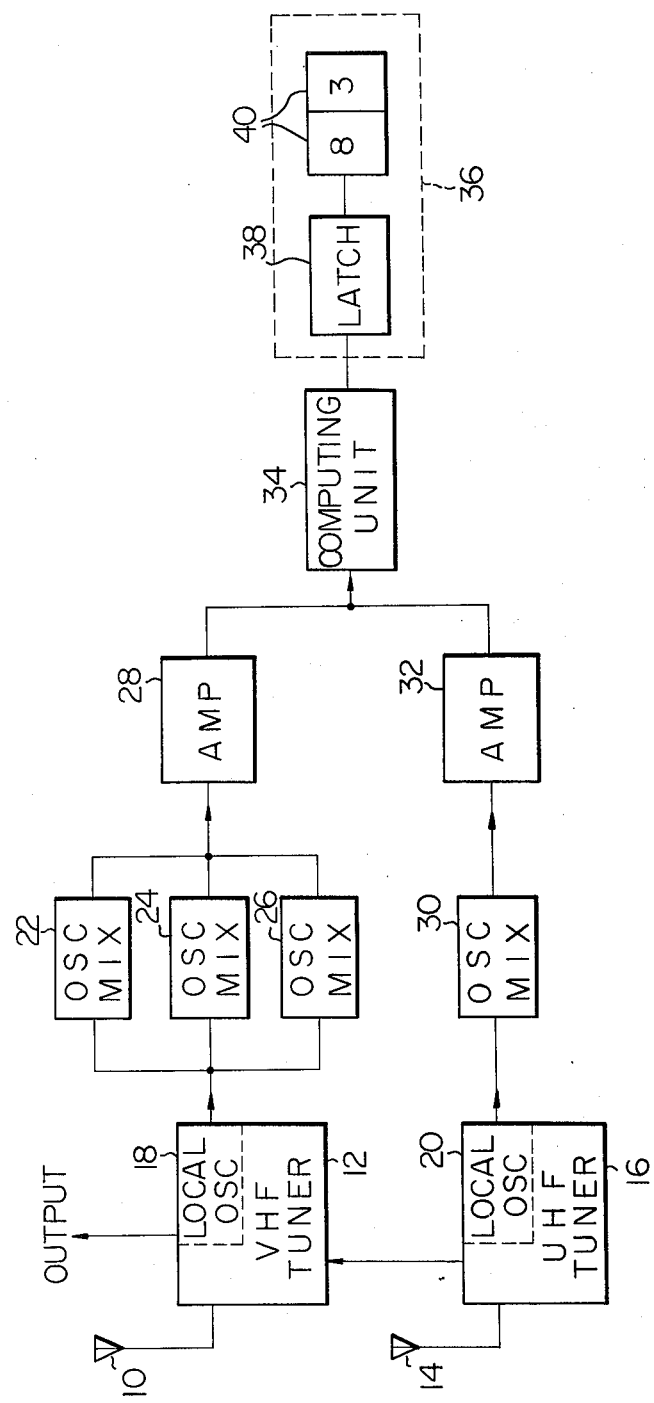
FIG. 2 is a block diagram of a channel indicator embodying the present invention.

Referring now to FIG. 2, a television receiver (no numeral) comprises a VHF antenna 10 which is connected to a VHF tuner 12 and a UHF antenna 14 which is connected to a UHF tuner 16. The television receiver is of the hetrodyne type, and the VHF tuner 12 has a video local oscillator 18 and the UHF tuner 16 has a video local oscillator 20. The UHF IF signal from the UHF tuner 16 is fed to the VHF tuner 12 for radio frequency amplification in a conventional manner, and the output of the VHF tuner 12 is fed to an IF amplifier (not shown).

The local oscillator 18 of the VHF tuner 12 is connected to the inputs of three oscillator-mixer units 22, 24 and 26, each being arranged to produce oscillations at a respective fixed frequency and mix them with the local oscillator signal to produce a difference frequency output. The units 22, 24 and 26 are associated with the channel subranges 2-4, 5-6 and 7-13 respectively as will be described in detail below. The output of the units 22, 24 and 26 are connected to the input of a wideband amplifier 28 having a bandwidth of 12 to 78MHz.

The local oscillator 20 of the UHF tuner 16 is connected to the input of an oscillator-mixer unit 30 similar to the units 22, 24 and 26 but associated with channels 14–83. The output of the unit 30 is connected to a wideband amplifier 32 having a bandwidth of 84 to 498MHz. The outputs of the amplifiers 28 and 32 are connected to the input of a computing unit 34, the output of which is connected to the input of a display unit 36 comprising a memory element such as a latch 38 and a display device such as two Numatron tubes 40.

Figure 3:
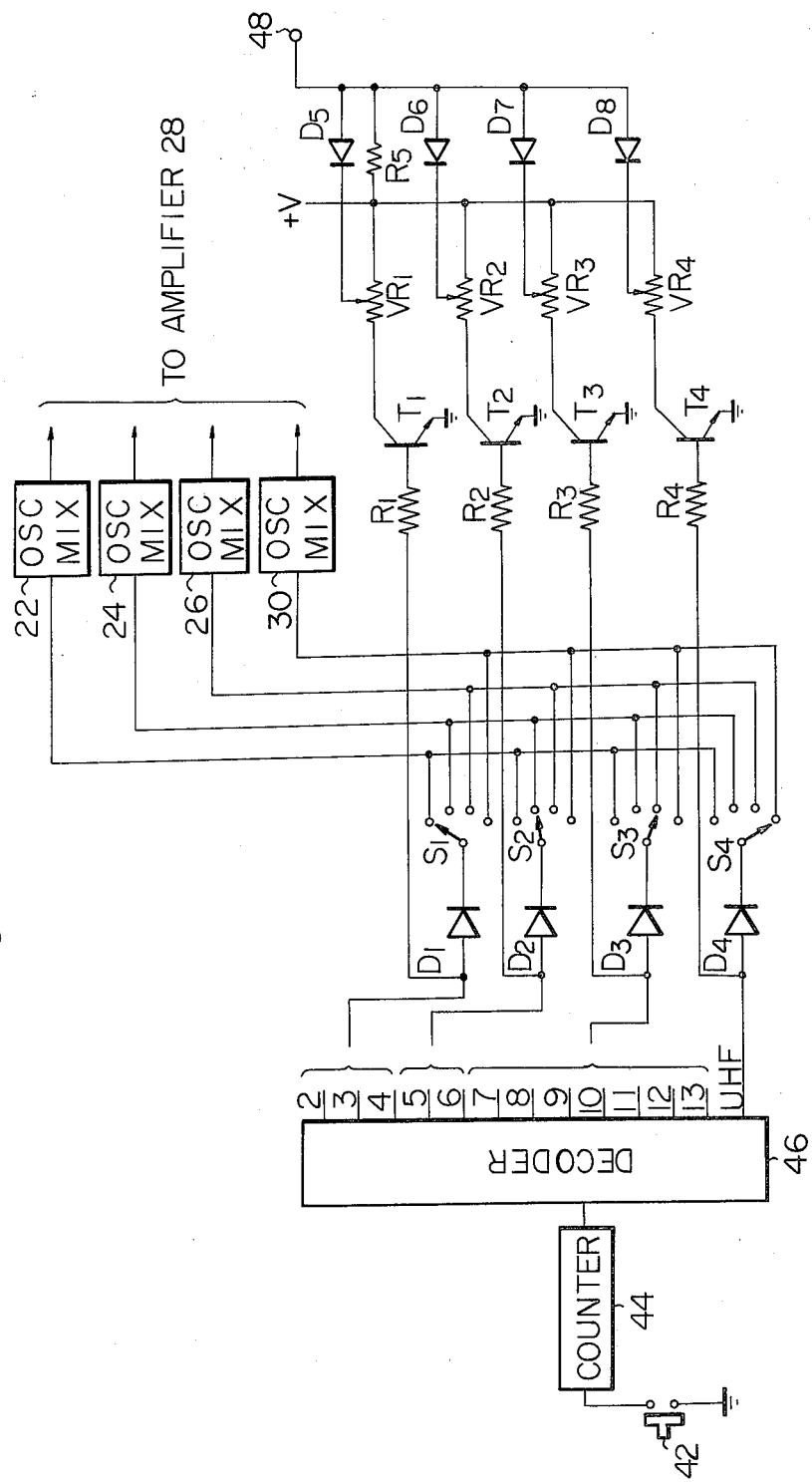
FIG. 3 is an electrical schematic diagram, partly in block form, of part of a television receiver connected to part of the channel indicator.

Referring now to FIG. 3, the channel switching apparatus of the television receiver may be used to select or energize the desired unit 22, 24, 26 or 30, and comprises a channel selection button or switch 42 which is pressed repeatedly to select channels in the sequence 2 to 13, UHF, 2 to 13, etc. Depression of the button 42 increments a binary counter 44 which is arranged to count up to 12 and then return to 0. The output of the counter 44 is decoded by a decoder 46 which sequentially produces high outputs designated as 2 to 13 and UHF corresponding to the selected channels. The outputs 2 to 4 are connected to the anodes of diodes $D_1$ (only one is shown) respectively, the cathodes of which are connected to movable contacts of bandswitches $S_1$ (only one is shown). Each bandswitch has four fixed contacts which are connected to the inputs of the units 22, 24, 26 and 30 respectively. The movable contacts of the switches $S_1$ are connected to the fixed contacts which are connected to the unit 22 whereby the outputs 2 to 4 of the decoder 46 are connected to the unit 22.

In an essentially similar manner, the outputs 5 and 6 are connected through diodes $D_2$ and bandswitches $S_2$ (only one each is shown) to the unit 24. The outputs 7 to 13 are connected through diodes $D_3$ and bandswitches $S_3$ (only one each is shown) to the unit 26. The UHF output of the decoder 46 is connected through a single diode $D_4$ and bandswitch $S_4$ to the unit 30.

As further shown in FIG. 3 for reference, the anode of each diode $D_1$ to $D_3$ and the single diode $D_4$ is connected through a resistor $R_1$ to $R_4$ to the base of a respective NPN transistor $T_1$ to $T_4$. The emitters of the transistors $T_1$ to $T_4$ are grounded and the collectors are connected through the resistance elements of potentiometers $VR_1$ to $VR_4$ respectively to a positive DC source +V. A resistor $R_5$ is connected between the source +V and a tuning voltage output terminal 48. The anodes of diodes $D_5$ to $D_8$ are connected to the terminal 48, and the cathodes thereof are connected to the sliders of the potentiometers $VR_1$ to $VR_4$ respectively.

The potentiometers $VR_1$ to $VR_4$ (one for each VHF channel and one for UHF) are set to apply the proper tuning voltage to the varactor tuning unit (not shown) from the terminal 48. When, for example, the television viewer wishes to watch channel 5, he presses the button 42 until the output 5 of the decoder 46 is high (all other outputs are low), energizing the unit 24 through the diode $D_2$ and bandswitch $S_2$. The high output 5 applied through the resistor $R_2$ to the base of the transistor $T_2$ causes the transistor $T_2$ to conduct. The collector voltage of the transistor $T_2$ assumes a value close to zero, and the diode $D_6$ is forward biased by the source +V through the resistor $R_5$ so that the slider voltage of the potentiometer $VR_2$ is applied to the terminal 48. All of the other transistors are cut off since the respective outputs of the decoder 46 are low, so that their collector voltages are close to the voltage of the source +V. All of the diodes $D_5$, $D_7$ and $D_8$ and the diode $D_6$ associated with the output 6 of the decoder 46 are reverse biased since their cathode voltages (at the sliders of the potentiometers $VR_1$ to $VR_4$) are almost the voltage of the source +V whereas their anode voltages (at the terminal 48) are considerably less than the voltage of the source +V.

Figure 4:
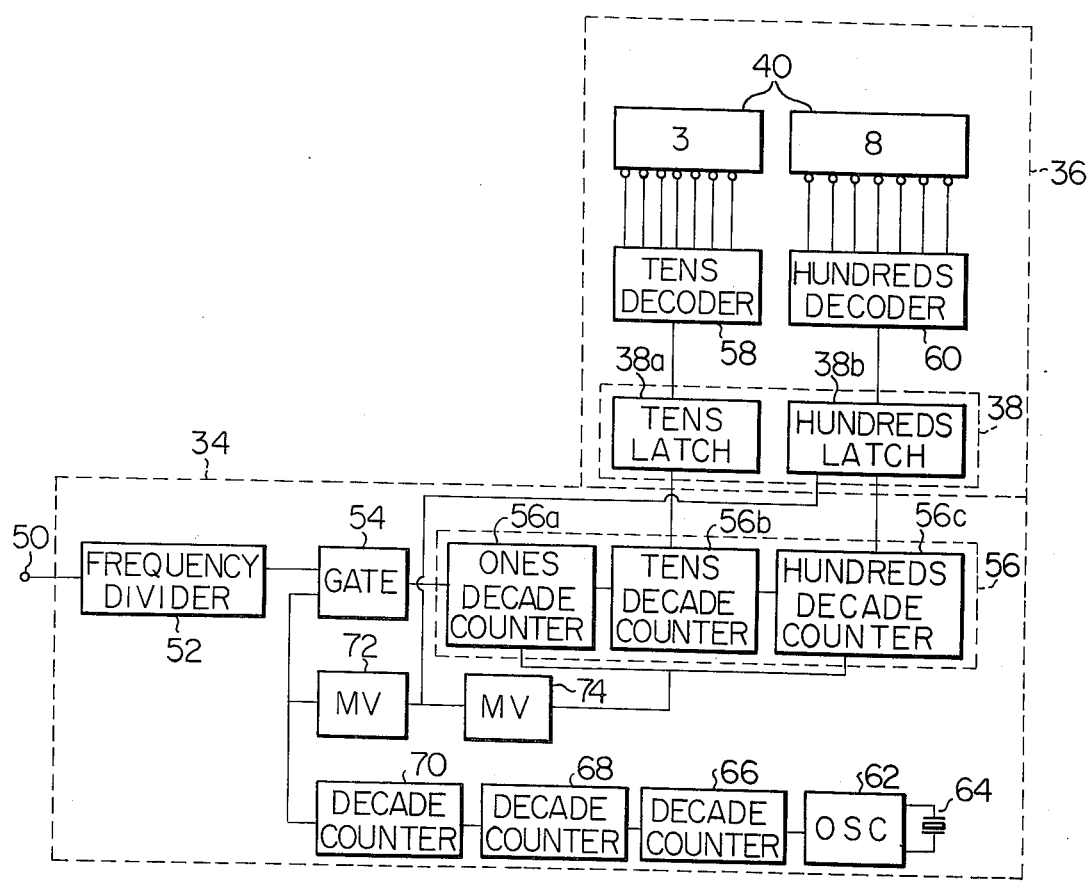
FIG. 4 is a block diagram of part of the channel indicator.

Referring now to FIG. 4, the computing unit 34 and display unit 36 are shown in greater detail. The outputs of the amplifiers 28 and 32 are connected to an input terminal 50 of the computing unit 34, which comprises a frequency divider 52 adapted to divide the input frequency by a factor of 600. The frequency divider 52 may comprise, for example, a counter (not shown) arranged to count from 0 to 599 and provide an output pulse and reset itself to 0 in response to each 600th input oscillation.

The output of the frequency divider 52 is connected through a gate 54 to a counter 56 comprising three decade counters 56a, 56b and 56 c connected in series for counting ones, tens and hundreds respectively. The outputs of the counters 56b and 56c are connected through a tens latch 38a and a hundreds latch 38b of the latch 38 and a tens decoder 58 and a hundreds decoder 60 to the Numatron tubes 40 respectively.

A gate pulse oscillator 62 is controlled by a crystal 64 to oscillate at 500KHz, and its output is applied through decade counters 66, 68 and 70 which divide the frequency to provide gating pulses at 500Hz to the gate 54. A monostable multivibrator 72 also has an input connected to the output of the decade counter 70, and an output connected to control inputs of the latches 38a and 38b. Another monostable multivibrator 74 has its input connected to the output of the multivibrator 72 and an output connected to reset inputs of the counters 56a, 56b and 56c. The multivibrators 72 and 74 act as switch means as will be described below.

In accordance with an important feature of the present invention, the indicator is adapted to produce the channel number N in the counter 56 in response to the local oscillator 18 or 20 frequency F in the following format:

$$10N < 10(N + 1) \qquad (4)$$

For example, channel 43 would be represented in the counter 56 as a number between 430 and 439. In any case, the channel number N is constituted by the tens and hundreds place digits, and reference to FIG. 4 will disclose that the ones place digit (in the decade counter 56a) is not fed to the display unit 36. The indicator is specifically designed so that the absolutely correct representation of the channel number is $$10(N + \tfrac{1}{2}) \quad (7)$$

in which case channel 43 is represented as 435 in the counter 56. This arrangement is very advantageous in ensuring that the channel number is correctly displayed even if the local oscillator frequency is not absolutely correct, as will be clear from the following description.

In order to achieve the above relationship (7), the fixed frequencies of the oscillator-mixer units 22, 24, 26 and 30 are set to 86, 90, 176 and 430MHz respectively, which are 3MHz (one-half channel bandwidth) above the values of (B) in equations (1) to (4) respectively. The frequency divided gating pulses at 500Hz fed to the gate 54 are arranged so the first half of each gating pulse is a positive square wave and the second half is a negative square wave. The positive square wave portion thereby has a pulse width of 1ms and is utilized to enable the gate 54.

The operation of the indicator will now be described in detail, assuming that the television viewer has selected channel 3, the output 3 of the decoder 46 is high and the unit 22 is energized whereas the units 24, 26 and 30 are de-energized.

The frequency of the local oscillator 18 of the VHF tuner 12 is 107MHz, since the picture carrier frequency for channel 3 is 61.25MHz and the IF frequency is 45.75MHz. This 107MHz local oscillator signal is applied to the oscillator-mixer unit 22 which, as mentioned above, produces a fixed frequency signal of 86MHz. The unit 22 mixes the 107MHz local oscillator signal with its own 86MHz signal to produce a difference frequency signal of 21MHz, which is fed through the amplifier 28 to the frequency divider 52. The frequency divider 52 divides the 21MHz signal by a factor of 600 to produce an output frequency of 35KHz. The amplifier 28 or frequency divider 52 may be arranged to change the signal waveform from sinusoidal to square wave if desired. The counter 56 is assumed as being reset to 0, and the leading edge of the positive portion of a gating pulse from the decade counter 70 enables the gate 54 for 1ms. During this predetermined time period of 1ms, 35 oscillations from the frequency divider 52 will be gated through the gate 54 into the counter 56 so that the final count in the counter becomes 35. The leading edge of the gating pulse also triggers the multivibrator 72, which has a pulse width slightly greater than 1ms. The trailing edge of the pulse from the multivibrator 72 triggers the latch 38 so that the tens and hundreds place digits of the number 35 are transferred into the latch 38. These digits (03), which are in binary form in the latch 38, are decoded by the decoders 58 and 60 and displayed as the correct channel indication (03) by the Numatron tubes 40. If desired, means (not shown) may be provided to suppress the hundreds place indication when the hundreds place digit is zero so that only, in this example, the 3 will be displayed.

The trailing edge of the pulse from the multivibrator 72 also serves to trigger the multivibrator 74, which has a pulse width less than 1ms. The trailing edge of the pulse produced by the multivibrator 74 reset the counter 56.

Three more examples will be presented utilizing the units 24, 26 and 30 respectively.

The television viewer selects channel 6, energizing the unit 24. The channel 6 local oscillator frequency is 129MHz, since the picture carrier frequency is 83.25MHz. This frequency of 129MHz is combined with the unit 24 frequency of 90MHz to provide a difference frequency output of 39MHz, which is divided by a factor of 600 by the frequency divider 52 to produce 65KHz. During 1ms, 65 oscillations are gated to the counter 56, and the tens place digit (6) is displayed as the correct channel number.

The television viewer selects channel 12, energizing the unit 26. The channel 12 local oscillator frequency is 251MHz, since the picture carrier frequency is 205.25MHz. Combination of the 251MHz local oscillator signal with the 176MHz signal in the unit 26 produces a difference frequency of 75MHz, which is divided by 600 to produce 125KHz. 125 oscillations are gated to the counter 56 during 1ms, and the hundreds and tens place digits (1) and (2) are displayed to produce the correct channel indication of (12).

The television viewer selects UHF channel 81, energizing the unit 30. The channel 81 local oscillator frequency is 919MHz, since the picture carrier frequency is 873.25MHz. The unit 30 frequency is 430MHz, so the difference frequency is 489MHz, which is divided by 600 to 815KHz. 815 oscillations are gated to the counter 56 during 1ms, and the hundreds and tens place digits (8) and (1) are displayed as the correct channel indication (81).

The many advantages of the present invention over the prior art are readily apparent. An indicator embodying the present invention does not comprise nonlinear elements which are subject to approximation and tracking errors. Assuming that the local oscillator frequency, frequencies of the units 22, 24, 26 and 30, division ratio of the frequency divider 52 and pulse width of the gating pulses are perfect, the indicator will produce absolutely precise results since it operates by solving precise linear equations. In practical applications in which said variables are not perfect, the indicator will still produce correct channel indications due to its novel design. The local oscillator frequency and the frequency of the unit 22, 24, 26 or 30 which is energized may produce a combined difference frequency error of almost 3MHz (one-half channel bandwidth), but the indicator will still provide the correct channel indication. Similarly, the frequency divider 52, oscillator 62 and counter 56 may produce a counting error of 4 counts in either direction, but the indicator will still produce the correct channel indication. The entire indicator, except for the Numatron tubes 40, may be incorporated into a single integrated circuit chip, and therefore be produced with high accuracy and reliability at low cost on a mass production basis.

What is claimed is:

1. An indicator for a heterodyne receiver arranged to selectively receive a plurality of electromagnetic signals at frequencies respectively designated by numbers which are proportional to the local oscillator frequencies for the respective signals, the indicator comprising:

computing means connected to the local oscillator of the receiver to compute, based on the local oscillator frequency, the number corresponding to the signal selected by the receiver, said computing means comprising a counter to count the number of oscillations of the local oscillator during a predetermined period of time so that the final count of the counter contains the number corresponding to the selected signal;

the computing means further comprising a frequency divider connected between the local oscillator and the counter;

at least three mixers each connected between the local oscillator and the counter and at least three fixed frequency oscillators each connected to one of the mixers, each of the mixers feeding to the counter a signal having a frequency equal to the difference between the local and its respective fixed frequency oscillator frequencies; and display means connected to the computing means to display the number.

2. The indicator of claim 1, in which the display means comprises a memory element to store the number.

3. The indicator of claim 2, in which the computing means further comprises a gate pulse oscillator to feed a gate pulse to the counter to connect the counter to the local oscillator during the predetermined period of time.

4. The indicator of claim 3, further comprising switch means controlled by the gate pulse to transfer the final count of the counter to the display means after the predetermined period of time.

5. The indicator of claim 4, further comprising switch means controlled by the gate pulses to reset the counter after the final count is transferred to the display means.

* * * * *